Dec. 31, 1935.   C. T. PHILLIPS   2,026,430
FRUIT THINNER
Filed April 1, 1935
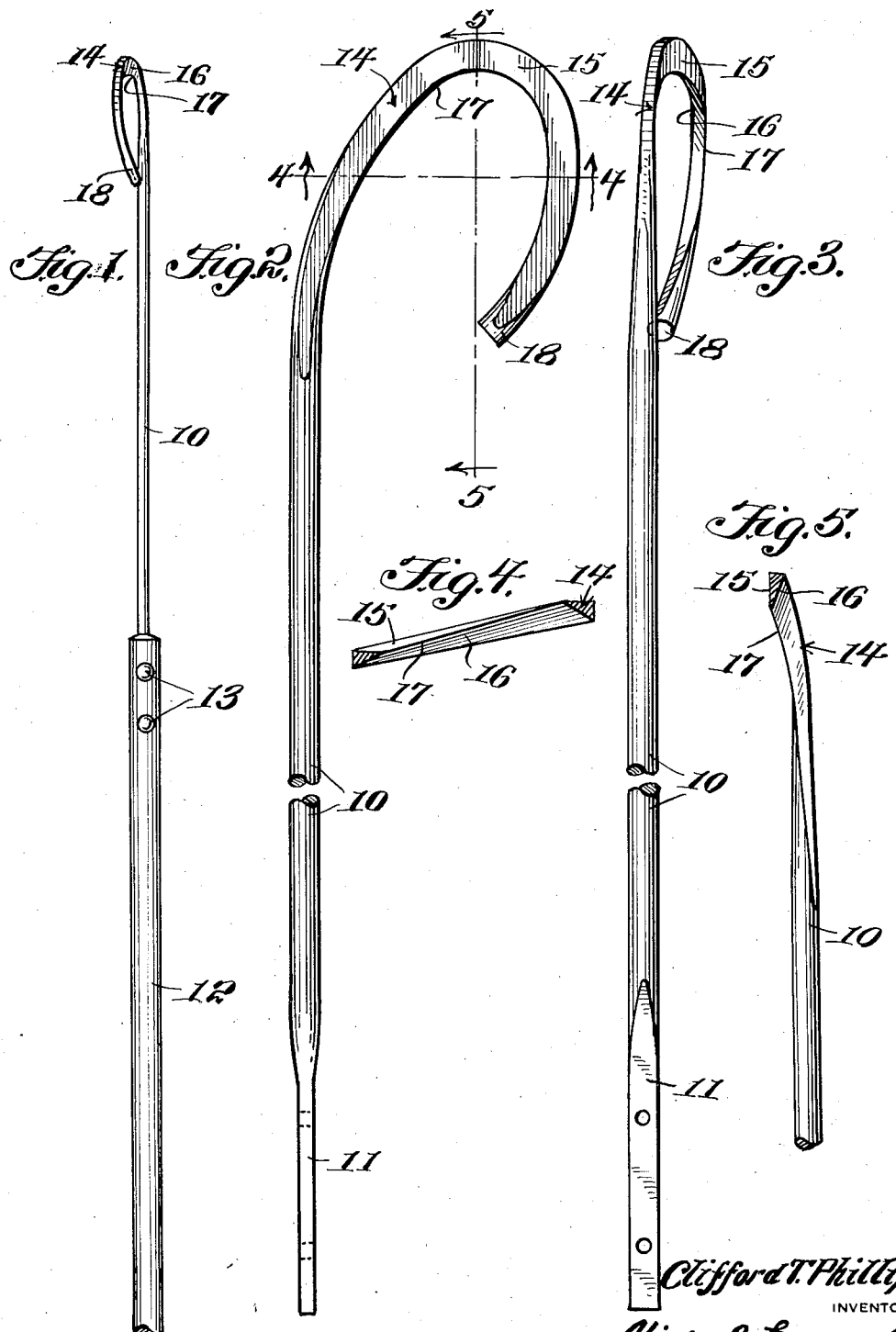
Clifford T. Phillips
INVENTOR
BY Victor J. Evans & Co.
ATTORNEY Patented Dec. 31, 1935

2,026,430

UNITED STATES PATENT OFFICE 2,026,430

FRUIT THINNER

Clifford T. Phillips, Red Hook, N. Y.

Application April 1, 1935, Serial No. 14,173

2 Claims. (Cl. 30—9)

The invention relates to an implement and more especially to a fruit thinner.

The primary object of the invention is the provision of an implement of this character, wherein through the medium of a cutting hook fruit upon a tree can be reached for the thinning of the crop and the cutting hook being of a kind for throwing the fruit away from a bud borne by the tree so as to avoid disturbing the bud next to the fruit severed from the said tree.

Another object of the invention is the provision of an implement of this character, which allows a maximum reach so that fruit can be thinned both close to the ground and at the highest point of the tree of average size.

Another object of the invention is the provision of an implement of this character, wherein the construction thereof is novel in form so as to permit the thinning of fruit with dispatch from growing trees, easy of manipulation and positive in the working thereof.

A still further object of the invention is the provision of an implement of this character, which is extremely simple in construction, thoroughly reliable and efficient in its operation, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is an elevation of the implement constructed in accordance with the invention.

Figure 2 is a side view thereof.

Figure 3 is a rear elevation.

Figure 4 is a sectional view on the line 4—4 of Figure 2 looking in the direction of the arrows.

Figure 5 is a fragmentary sectional view on the line 5—5 of Figure 2 looking in the direction of the arrows.

Similar reference characters indicate corresponding parts throughout the several views in the drawing.

Referring to the drawing in detail, the implement comprises a shank or stem 10 preferably made from a rigid rod of metal having a flattened end 11 to be accommodated within a handle 12 which is made fast by rivets 13 for fixedly joining the stem or shank with the handle. It is, of course, understood that the stem or shank and the handle may be of any required length to give the maximum reach to the implement in its use.

The other end of the stem or shank is formed with a rounded hook 14 having a flattened side 15 and a beveled side 16, respectively, to provide a cutting edge 17 interiorly of the hook 14, the bill or tip 18 of the hook 14 being blocked. This hook 14 is helically bent in a lateral direction so as to offset the cutting edge 17 to one side of the axis of the shank or stem 10 and the purpose of this is that when the hook is engaged with a fruit growing upon a tree when the latter is severed for thinning purposes of the tree it will be thrown away from a bud next thereto for the protection of next year's crop and in this manner avoiding damage to the bud.

In the use of the implement the hook 14 is engaged about the stem of the fruit when growing upon a tree and on a pull upon the handle 12 the cutting edge 17 will sever the stem and as previously indicated the fruit will be cast away from a growing bud next thereto upon a tree.

What is claimed is:

1. An implement of the character described, comprising a rod-like stem having an elongated straight shank and a rounded hook helically arranged and terminally formed with a blunt bill, the blunt bill being disposed to curve inwardly toward the shank, and opposite flat and beveled faces coextensive with the hook and terminating short of the blunt bill to provide an inner cutting edge having a spiral trend.

2. An implement of the character described, comprising a rod-like stem having an elongated straight shank and a rounded hook helically arranged and terminally formed with a blunt bill, the blunt bill being disposed to curve inwardly toward the shank, opposite flat and beveled faces coextensive with the hook and terminating short of the blunt bill to provide an inner cutting edge having a spiral trend and a handle carried by said stem.

CLIFFORD T. PHILLIPS.